(12) United States Patent
Moon

(10) Patent No.: US 11,768,951 B2
(45) Date of Patent: Sep. 26, 2023

(54) SYSTEMS AND METHODS OF GESTURE TRIGGERED AUTOMATIC ERASURE ON A PRIVATE NETWORK

(71) Applicant: Whitestar Communications, Inc., Durham, NC (US)

(72) Inventor: Billy Gayle Moon, Durham, NC (US)

(73) Assignee: WHITESTAR COMMUNICATIONS, INC., Apex, NC (US)

(*) Notice: Subject to any disclaimer, the term of this patent is extended or adjusted under 35 U.S.C. 154(b) by 63 days.

(21) Appl. No.: 17/552,834

(22) Filed: Dec. 16, 2021

(65) Prior Publication Data

US 2022/0108034 A1 Apr. 7, 2022

Related U.S. Application Data

(63) Continuation of application No. 16/518,586, filed on Jul. 22, 2019, now Pat. No. 11,256,822.

(51) Int. Cl.
*G06F 21/62* (2013.01)
*G06F 21/60* (2013.01)
*H04L 12/46* (2006.01)
*H04L 9/40* (2022.01)
*G06F 3/01* (2006.01)
*G06F 3/16* (2006.01)
(Continued)

(52) U.S. Cl.
CPC .......... *G06F 21/6218* (2013.01); *G06F 3/017* (2013.01); *G06F 3/167* (2013.01); *G06F 21/602* (2013.01); *H04L 12/4641* (2013.01); *H04L 63/0428* (2013.01); *H04L 67/303* (2013.01)

(58) Field of Classification Search
None
See application file for complete search history.

(56) References Cited

U.S. PATENT DOCUMENTS 7,962,702 B1 * 6/2011 Bean ................. G06F 21/79
711/E12.091
8,621,597 B1 * 12/2013 Jenkins, IV ..... H03K 19/17768
726/14
(Continued)

OTHER PUBLICATIONS

Anomalous User Activity Detection in Enterprise Multi-Source Logs. Hu. IEEE. (Year: 2017).*
(Continued)

*Primary Examiner* — Venkat Perungavoor

(74) *Attorney, Agent, or Firm* — Deepali Brahmbhatt; Devlin Law Firm LLC

(57) ABSTRACT

The systems and methods of gesture triggered automatic erasure on a private network, comprising: securely connecting, embedding, sending information within one or more secure objects on the first computing device; detecting, by the first computing device, a signal as a zeroization trigger responsive to a user gesture; and sending, by the first computing device via the private network, a message informing the second computing device of the zeroization trigger, the message causing the second computing device to execute automatic erasure of the one or more secure objects stored on the second computing device; wherein: the second computing device belongs to a zeroization group; the message causing each member computing device belonging to the zeroization group to execute the automatic erasure of the one or more secure objects.

11 Claims, 8 Drawing Sheets

(51) Int. Cl.
  *H04L 67/303* (2022.01)
  *G06F 21/88* (2013.01)
  *G06F 21/71* (2013.01)

(56) References Cited

U.S. PATENT DOCUMENTS

| | | | |
|---|---|---|---|
| 2006/0023486 A1* | 2/2006 | Furusawa | G06F 21/79 |
| | | | 365/145 |
| 2006/0055685 A1 | 3/2006 | Rimas-Ribikauskas et al. | |
| 2013/0055160 A1 | 2/2013 | Yamada et al. | |
| 2013/0159732 A1* | 6/2013 | Leoutsarakos | H04L 9/085 |
| | | | 713/193 |
| 2013/0185815 A1 | 7/2013 | Leoutsarakos | |
| 2014/0108486 A1 | 4/2014 | Borzycki et al. | |
| 2014/0331175 A1 | 11/2014 | Mesguich Havilio | |
| 2015/0213243 A1 | 7/2015 | Hughes et al. | |
| 2016/0142532 A1 | 5/2016 | Bostick et al. | |
| 2017/0048339 A1 | 2/2017 | Straub | |
| 2018/0034804 A1 | 2/2018 | Steiner | |
| 2018/0159841 A1 | 6/2018 | Toff | |
| 2018/0164892 A1 | 6/2018 | Han et al. | |
| 2018/0165514 A1 | 6/2018 | Lehtiniemi | |
| 2020/0066047 A1 | 2/2020 | Karalis et al. | |
| 2020/0103980 A1 | 4/2020 | Katz et al. | |
| 2020/0327242 A1 | 10/2020 | Falk | |

OTHER PUBLICATIONS

Detecting Anomalous Network Traffic in Organizational Private Networks . Vaarandi. IEEE. (Year: 2013).*
Dissenter, Frequently Asked Questions at https://dissenter.com/help/faq, Apr. 16, 2017.
https://www.web2pdfconvert.com/, 2018.
https://www.codester.com/items/_13206/web2pdf-ios-source-code, 2018.
Zeroisation at https://en.wikipedia.org/wiki/Zeroisation, 2018.
IBM Az/OS Cryptographic Services, Integrated Cryptographic Service Facility, Application Programmer's Guide, p. 50, 2011.
FIPS PUB 140-2, May 25, 2001.
DIBS at https://github.com/emin63/dibs, 2014.
https://github.com/bernardobelchior/distributed-backup-service.
https://github.com/afonsocastro96/SDIS-Project2, 2016.
https://sourceforge.net/projects/p2pbackupsmile/, 2010.
https://www.infostor.com/nas/58-top-open-source-storage-project-1.html, Dec. 26, 2013.
CDN disclosed at https://en.wikipedia.org/wiki/Content_delivery-network, 2015.
BitTorrent Speed to Strength BitTorrent Protocol, Connect users with (BTT) tokens, McBrown, Jan. 17, 2019 at http://blog.bittorrent.com/2019/01/17/bittorrent-speed-to-strength-bittorrent-protocol-connect-users-with-btt-tokens/.
An Intelligent Attempt to Export Files into Cloud in Handheld Devices through Gesture Recognition. Vasudevan. IJST (Year 2015).
User-Dependent Gesture Recognition on Android Handheld Devices. Marasovic (Year 2015).
Common Biometric Authentication Techniques: Comparitive Analysis, Usability and Possible Issues Evaluation. Bawany. ISCA. (Year: 2013).
Tap-Wave-Rub: Lightweight Malware Prevention for Smartphones using Intuitive Human Gestures. Li. ACM. (Year: 2013).
Unlocking Smart Phone through Handwaving Biometrics. Yang. IEEE. (Year: 2015).
An Evaluation of an Augmented Reality Multimodal Interface Using Speech and Paddle Gestures. Irawati. Springer-Verlag. (Year: 2006).

* cited by examiner

SYSTEMS AND METHODS OF GESTURE TRIGGERED AUTOMATIC ERASURE ON A PRIVATE NETWORK

CROSS-REFERENCE TO RELATED APPLICATIONS

This application is a continuation of U.S. application Ser. No. 16/518,586, filed Jul. 22, 2019. The following Whitestar Communications, Inc.'s filed patent applications are incorporated herein by reference: (1) "SYSTEMS AND METHODS OF SALUTATION PROTOCOL TO COMMUNICATE USING A PRIVATE OVERLAY PEER TO PEER NETWORK." and patent application Ser. No. 16/518,292; (2) "SYSTEMS AND METHODS OF SECURING DIGITAL CONVERSATIONS FOR ITS LIFE CYCLE AT SOURCE, DURING TRANSIT AND AT DESTINATION" and patent application Ser. No. 16/518,406; (3) "SYSTEMS AND METHODS OF COLLABORATIVE APPLICATION ON A PRIVATE NETWORK" and patent application Ser. No. 16/518,491; (4) "SYSTEMS AND METHODS OF ENFORCING COMMUNICATIONS SEMANTICS ON A PRIVATE NETWORK" and patent application Ser. No. 16/518,538; (5) "SYSTEMS AND METHODS OF DISTRIBUTED BACKUP AND RECOVERY ON A PRIVATE NETWORK" and patent application Ser. No. 16/518,680; and (6) "SYSTEMS AND METHODS OF DELEGATION OR REPLICATION ON A PRIVATE NETWORK" and patent application Ser. No. 16/518,706.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

FIELD OF THE INVENTION

The present invention is in the technical field of automatic erasure or zeroization of content within secure and encrypted private networks. More particularly, the present invention is in the technical field of gesture triggered automatic erasure that is network wide. More particularly, the present invention is in the technical field of retaining control on deletion at the source of origination for the content.

BACKGROUND

Current social media systems are enabled by central services provided by third parties. In essence, social media is interaction between two or more end-users that mirrors real-life situation where a third-party has no business interfering. But the digital world of the internet applications of social media do not align to the real-world frameworks.

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. In such systems, users rely on the social media companies to store and protect their sensitive user data both while in flight, i.e. in transit and at rest, i.e. either at source or destination.

While users don't pay "directly" for use of these services, the services providers generate revenue from its user content and meta data through directed ads and selling access to their subscribers content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers best interests and not necessary the interest of their users or user communities. In some cases the censorship is at the direction of a central government but in most cases it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users.

Further, social media companies typically deploy simply one-way authentication and HTTPS to secure their user's data in flight. Many enterprise networks (as well as others) are able to put a "man in the middle" of such traffic using an HTTPS proxy, thus exposing all data in flight to the intermediary and allowing that intermediary to filter, read, copy and save user content without them being aware of it.

One-way authentication only authenticates or assures the user that when they connect to a sight that "claims to be" say instagram, that in fact it is instagram. The converse is not true. The cryptographic system does not authenticate the client software used by the user and therefore must trust higher level protocols to assure that a user that claims to be user A is in fact user A, for example through passwords or other means.

Both sets of "keys", the ones that attest to the service provider's identity and the passwords used by the "user" are not changed very often, and can actually not change for years. This means that if either key is broken, that all the user's or even sights' data can be exposed. Breaking the keys to access a sights meta data can expose all data of every user in the system. Breaking a given user's key can expose all of a user's stored content.

In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

Accordingly, in the existing solutions in the industry, once content is created and distributed to existing network of systems, it: may exist indefinitely; the user may not have the ability to edit or append to the original message; may be free copied and distributed by others either directly or via screen captures or copy/paste operations; the user may never be able to delete the content when they feel like it; third parties can exploit the data.

Zeroization (also disclosed at the website en.wikipedia.org/wiki/Zeroisation) is known in the art of cryptography. Zeroization is the practice of erasing sensitive parameters/information from a system, i.e. a single computing device, to prevent their disclosure if the equipment is captured. In most cases in the art, the act of zeriozation is focused on a single machine and its compute, memory and storage. Information on a given computing device is local information which is then in transit when transmitting to another computing device. The originating computing device is the source computing device, the intermediate computing devices that receive the information are transit computing devices having transit information and the final target is the destination computing device. Computing devices designated as source, transit and destination are used for the travel of information on computer networks and corresponding computing device nodes. In particular, existing techniques focus on the following trigger points: When an application changes mode (e.g. to a test mode) or user; When a computer process changes privileges; On termination (including abnormal termination); On any error condition which may indicate instability or tampering; Immediately, the last time the parameter is required; and Possibly if a parameter has not been required for some time upon user request.

There are hardware-based mechanisms such as a physical button to zeroize a single computing device, often times with a cover over the button that must be depressed or actuated to indicate the user's desire to "zeroize" the system. There are also a number of standards for zeroization including ANSI X9.17 and FIPS 140-2. In all these cases, the focus is on cryptographically removing the information or at a minimum the keys on a single system when it has been compromised.

SUMMARY OF THE INVENTION

The present invention is systems and methods of gesture triggered automatic erasure on a private network, comprising: establishing a secure and encrypted private network with one or more profile computing devices; embedding local information on a first profile within one or more secure objects; embedding transit information exchanged by the first profile on the private network within one or more secure objects at source and destination; receiving a signal from the first profile computing device; automatically deleting one or more of the secure objects with embedded local and transit information from all profile computing devices.

The systems and methods of gesture triggered automatic erasure on a private network, wherein the signal is a user defined gesture.

The systems and methods of gesture triggered automatic erasure on a private network, wherein the gesture includes one or more of the following: any sequence of motions; rolling, circling, shaking, or rotating or rotating side to side the first profile computing device for a given number of times, pressing on the display in one or several places for a given amount of time, moving the first profile computing device in arm it movement, keying alternative password; speaking specific voice commands or a combination of gestures mentioned herein.

The systems and methods of gesture triggered automatic erasure on a private network, wherein the signal is automatically triggered based on a first computing device reaching proximity to a location marker.

The systems and methods of gesture triggered automatic erasure on a private network, wherein the signal is automatically triggered when a time period is lapsed.

The systems and methods of gesture triggered automatic erasure on a private network, wherein the signal is automatically triggered by another profile.

The systems and methods of gesture triggered automatic erasure on a private network, wherein the signal is automatically triggered on the first profile computing device when the signal is triggered on another profile.

The systems and methods of gesture triggered automatic erasure on a private network, further comprising: deleting all the secure objects.

The systems and methods of gesture triggered automatic erasure on a private network, further comprising: deleting all the secure objects on all profile computing devices on the private network other than the first profile computing device.

The systems and methods of gesture triggered automatic erasure on a private network, wherein the signal is triggered by a button.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
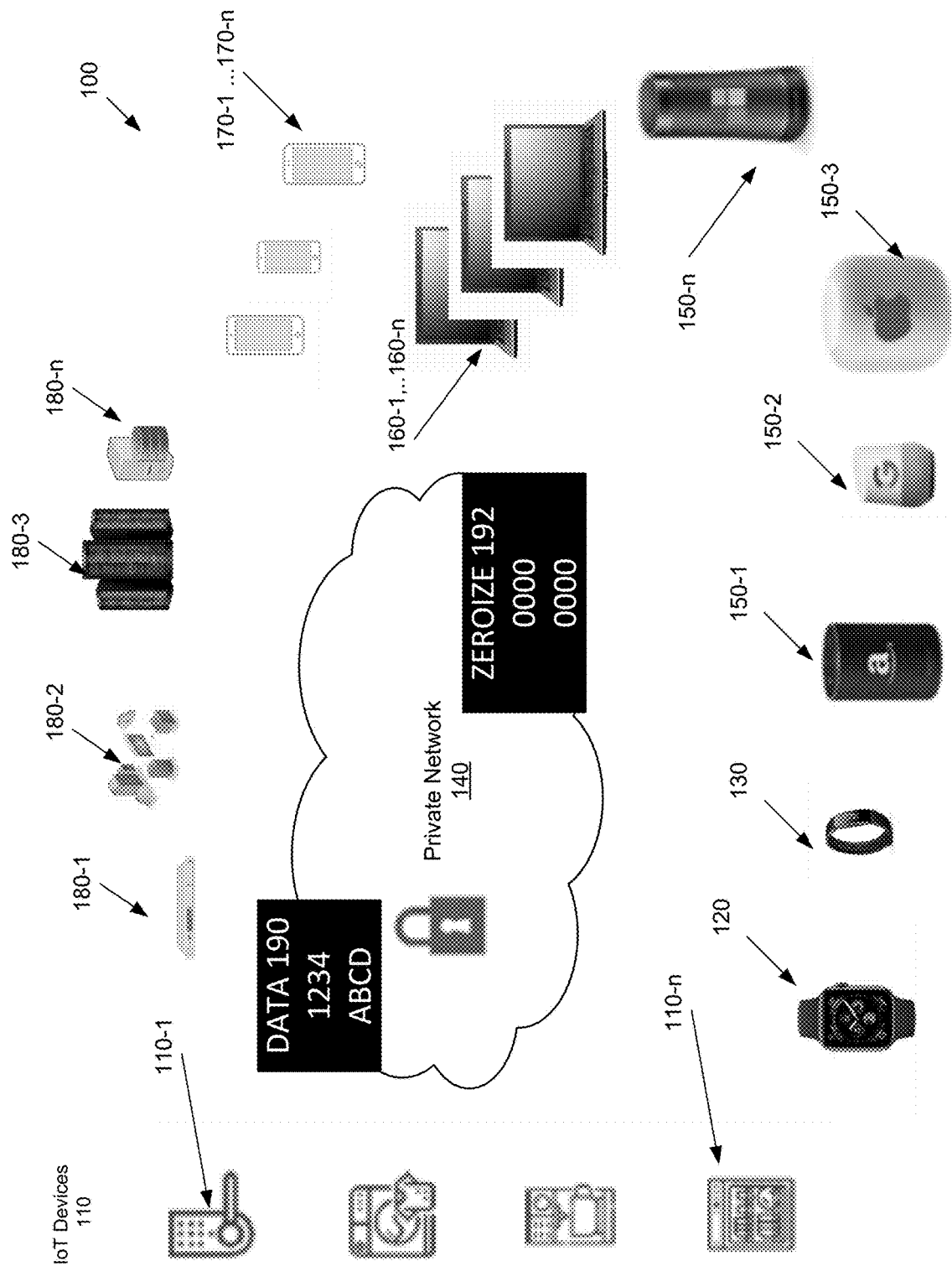
FIG. 1 shows a diagram illustrating an example of systems and methods systems and methods of gesture triggered automatic erasure on a private network with different types and categories of computing devices including internet of things devices.

The systems and methods of gesture triggered automatic erasure on a private network includes techniques to incorporate triggers based on time, location or different user gestures to erase data not only from the computing device receiving the signal but through the private network. Data, content or information inside the private network is always secure and encrypted. Data travels in secure objects that comply with the rules and restrictions of the private network. The operating system implementing the secure objects monitors for events that trigger erasure actions that are propagated throughout the private network.

The systems and methods of gesture triggered automatic erasure on a private network provides for a completely distributed social media platform that allows both humans and machines to freely associate with one another through a special salutation protocol. In this platform, there is no central service. There is no cost to stand up the platform. There are no additional costs as each new user joins the social network. Instead of a central services storing user content and facilitating user content distribution and user discovery, all these facilities are provided in a peer to peer social network by the users themselves.

No central authority can prevent the users from freely associating with one another or can exclude a given user from participation in social media with this system. A particular aspect of this is that users may, in fact be conversing about something about which if it were disclosed to a central government may lead to harsh punishment, including execution.

For example, it is common practice in Muslim countries to execute or at least severely punish Christians and bible works should they be found to be "sharing the gospel" in their country. In the same way, a Muslim might find himself in an internment camp in China for practicing his religion. This type of religious persecution is regrettably still common in the world today.

This invention discloses a novel means for zeroizing information that I been distributed throughout a social network based on a user gesture. The challenge which hasn't been addressed in the art is the distributed nature of the system. If user A, for example, provided comments about some bible verse to user's B and C then that commentary from user A could be extracted from three devices: user A's device, user B's device and user C's device. Naturally, this example can be extended to any size social network and it may include information created and shared by more than one party to a conversation.

The systems and methods of gesture triggered automatic erasure on the private network provides a mechanism for identifying which content should be zeroized should any member of a conversation be compromised and we provide for a mechanism for initiating the zeroization process.

In the first aspect, only content created by a single individual is subject to zeroization. The user defines a gesture to initiate the process. The gesture can be: any sequence of motions, such as shaking his device repeatedly some number of times; or rotating the device side to side several times; or pressing on the display in one or several places for a given amount of me; or even a simple alternative password that might be entered; or any combination of such things.

Once the gesture has been initiated, then the system carriers out the zeroization process. The system provides for zeroization options as follows: (i) Zeroize all or some of the user's contacts (other endpoints.). When this happens a message is sent to each counter party informing them of the zeroization trigger and those counter parties in turn, execute their own zeroization process, including removing any content on their own device that was created by the first user of the system. Should any of the information sent to a counter part from the original user have been forwarded then, a message is sent successively to each party in the distribution set until every device that contains the information has been informed of the zeroization request and carried out removal of the information. (ii) Zeroize one or more conversations Similar to the first scenario, but only zeroes conversations that have been enabled for it and all content in those conversations. (iii) Zeroize one or more messages. Scope narrowed to zeroing particular messages. (iv) Zeroize keystore. The user's keystore along with his private keys and password are removed from the system.

In a second aspect of the system, a group of users (endpoints) can participate in a special zeroization group. When any member of the group triggers zeriozation, then that trigger subsequently triggers zeriozation in all the devices owned by users that are members of the group as if each member had in turn trigged zeroization.

One of the main advantages of our system is that it is zeroizes distributed information here copies of the same information is located in more than one location.) Further, it can handle groups of people whom all wish to zerioize their information should any member of the group request zeriozation, Finally, it provides for selective zeriozation of some content on a device while leaving other content in place.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of securely connecting computing devices through the private network 140 as well as storing information securely on the computing devices before or after each transmission. In the example of FIG. 1, the environment includes a first IoT devices 110-1 through an nth client system 110-*n*, private network 140, a smart watch 120, a fitness tracker 130, intelligent voice assistants 150-1 to 150-*n*, personal computers from 160-1, . . . 160-*n*, smartphones from 170-1 to 170-*n*, servers from 180-1, . . . 180-*n*.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The data, information or content 190 flow is always encapsulated using secure objects through the private network that complies with automatic erasure signals that result in erased data zeroize 192. Because the data cannot escape from the private network and has to follow rules within the private network, the automatic erasure is enforced dynamically in a de-centralized manner.

The role of the computing device manufacturers is separated from the use of the computing devices in hosting applications. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A person of ordinary skill in the art would appreciate that by encapsulating information or data in objects that follow default rules including hierarchical and network-wide that complies with erasure signals, the private network operates freely without a fear of malicious attacks or abuse related to misuse. High-end security for systems can only be achieved when means are available to erase the data when the system is at risk. The invention described herein discloses mechanisms to enable this high-end security systems that allow for automatic erasure network-wide.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication.

Private Network 140 can be different wireless and wired networks available to connect different computer devices including client and server systems. In an implementation, private network 140 is publicly accessible on the internet through secure messaging protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
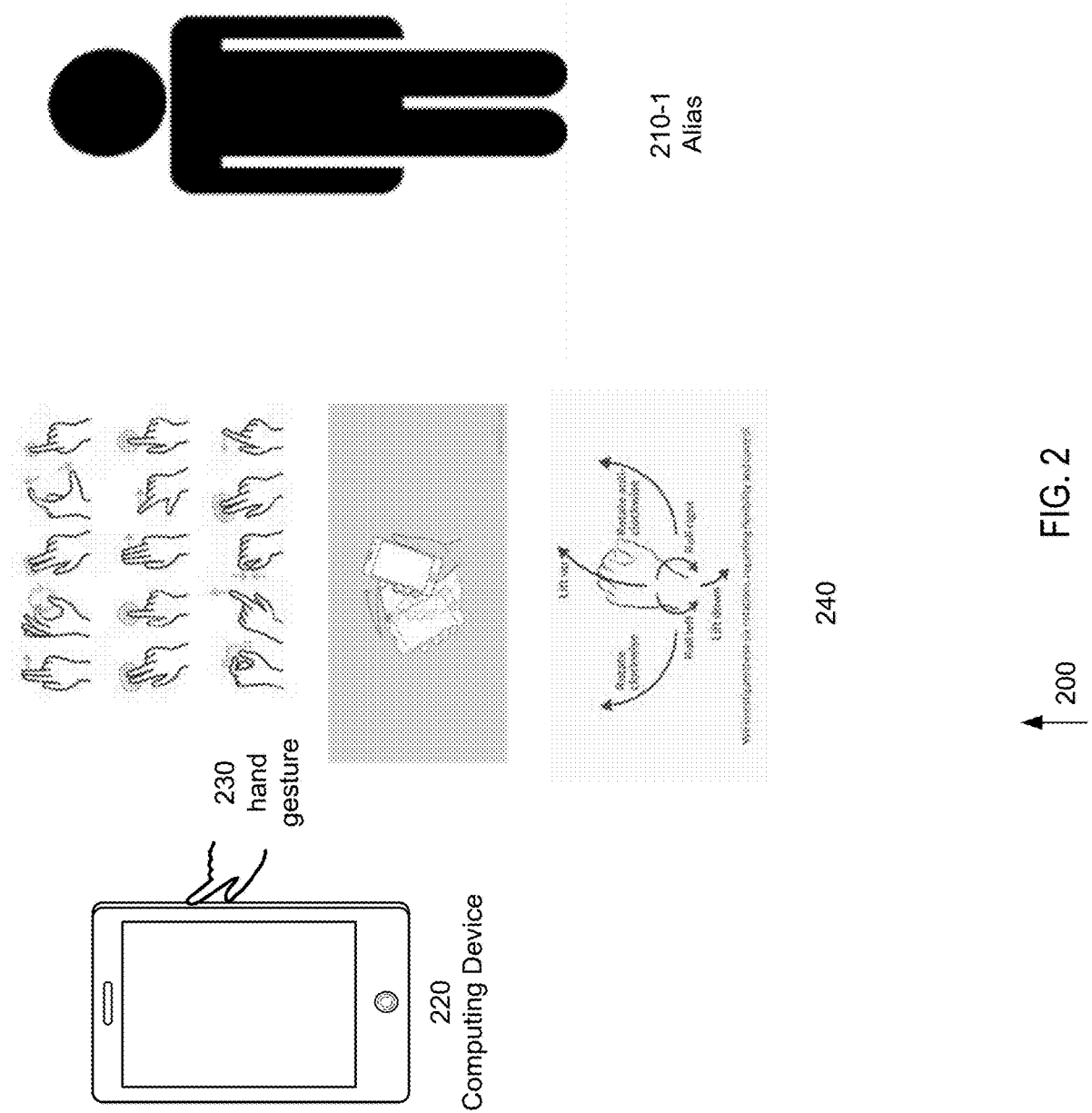
FIG. 2 shows different types of gestures associated with a computing device, according to one embodiment.

FIG. 2 is an exploded view 200 of different gestures by a user with alias 210-1 that can be used to signal a computing device 220. The different gestures are shown at 240 that include pressing, shaking, rotating, lifting up or down, clockwise or counterclockwise movements. The user hand at 230 can perform any of the gestures to trigger events on the computing device. A user may customize and select desired gesture to trigger automatic erasure. A person of ordinary skill in the art would understand that there may be different situations when a user may want to trigger automatic erasure. For example, the computing device may have highly sensitive and confidential information. When the user is approached by a person who wants to steal that device from the user, user may immediately invoke automatic erasure using one of the customized signals according to his or her preference.

Figure 3:
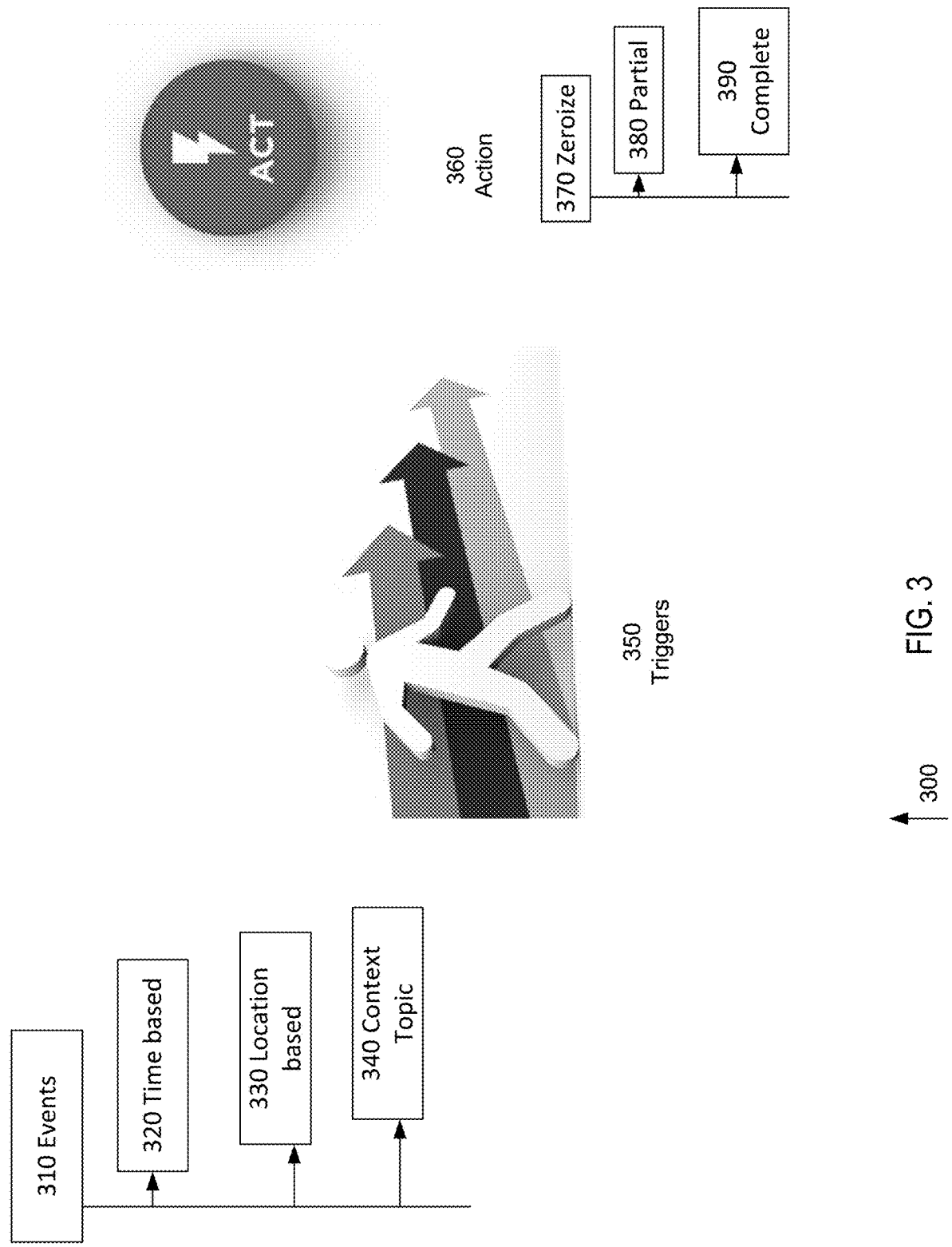
FIG. 3 is staged view of events, triggers and subsequent actions, according to one embodiment.

While FIG. 2 discloses user based gestures, the signal to the computing device can be triggered by non-user based events as well. For example, automatic erasure can be pre-configured based on lapse of time. A corporation may designate some information to be permitted to stay within the physical location of the corporate headquarters. If the computing device detects that it is moving out of the corporate headquarters, it can invoke automatic erasure based on location. Automatic erasures could also be based on topics of conversation. For example, a user may designate all topics related to a scandalous matter to be automatically erased after FIG. 3 outlines 300 showing different stages of events, triggers and subsequent actions that are automatically performed by the computing device. The computing device monitors different events 310 that have associated triggers 350. The triggers 350 subsequently lead to action 360. Events can be time based 320, location based 330 or context topic based 340. A time based event could be based on a lapse of time period, i.e. one year or one month from today. It could be based with the timestamp of the computing device shows a certain date/time. For example, on Thanksgiving day erase data. A location based event could be triggered when the computing device approaches a location or exits a location. There could be combination of time-based and location-based events. For example, one event could be based on staying at a given location for one hour or more. Context topic based events would be if computing device receives or sends data related to a certain topics. For example, an event could be related to following performance of a sports team, a music band or theater. It could be topic that is of interest to the user but is not interesting enough to be saved with hard drive, storage and network bandwidth costs.

Once triggered, the triggers push the computing device to perform certain acts. The automatic erasure act zeroize 370 can be complete erasure of everything on the computing device 390 or partial erasure 380. The automatic erasure can be invoked network wide on all linked and associated devices. For example, if conversation 1 is selectively erased, all copies of the conversation 1 from all recipients are also erased.

Figure 4:
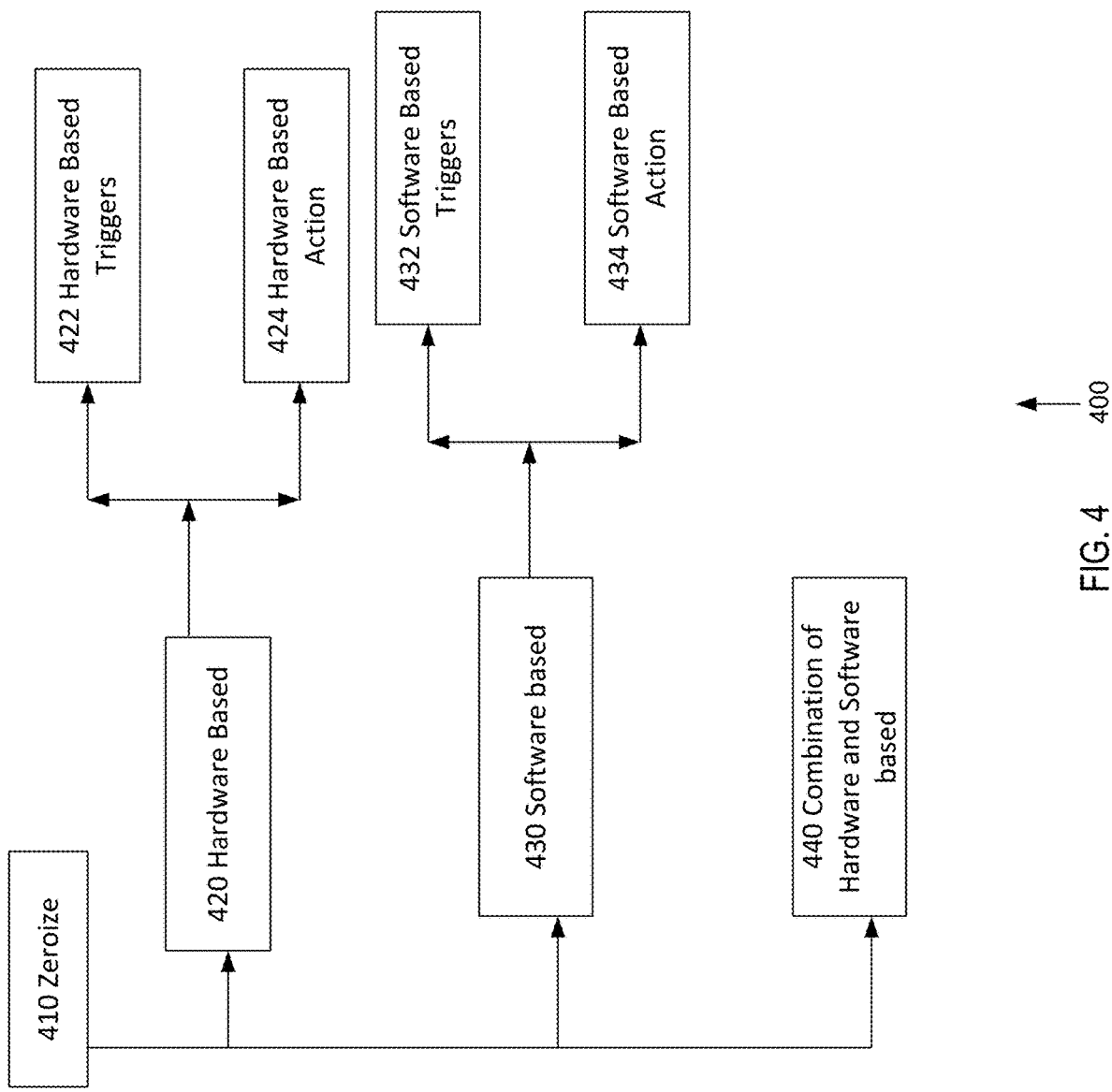
FIG. 4 is a view of different categories of zeroization methods, according to one embodiment.

FIG. 4 with 400 shows different categories of triggers and actions for the automatic erasure private network. The action zeroize 410 can be based on hardware 420, software 430 or a combination of hardware and software 440. Hardware based triggers 422 include mechanical chips that are explosive chips when tampered, a mobile Router push button or cell phone that self-destructs when sold to another carrier. Hardware based action 424 are self-destruct built-in chips that explode. Software based 430 functions include software based triggers 432 and software based actions 434. For example, software based action 432 includes software to remove FIPS. By default software erasure is to change all the data to zeros, i.e. formatting that space in the hard drive or storage.

For example, automatic erasure could be useful for translating religious texts in oppressed countries that could be automatically erased if caught otherwise would lead to death penalty. Similarly, there would be wide military applications for sensitive data.

The triggers can be based on gestures, for example, preset alternative password. Keystore can set password including alternative password which when used on the computing device triggers zeroization. Another gesture could be shake count, when triggered after maximum time between shakes is 30 seconds or more. Another gesture could be rolling, circling or arm it movement. A user could set a preference that anyone else in my list zeroizes, I should zeroize as well.

Figure 5:
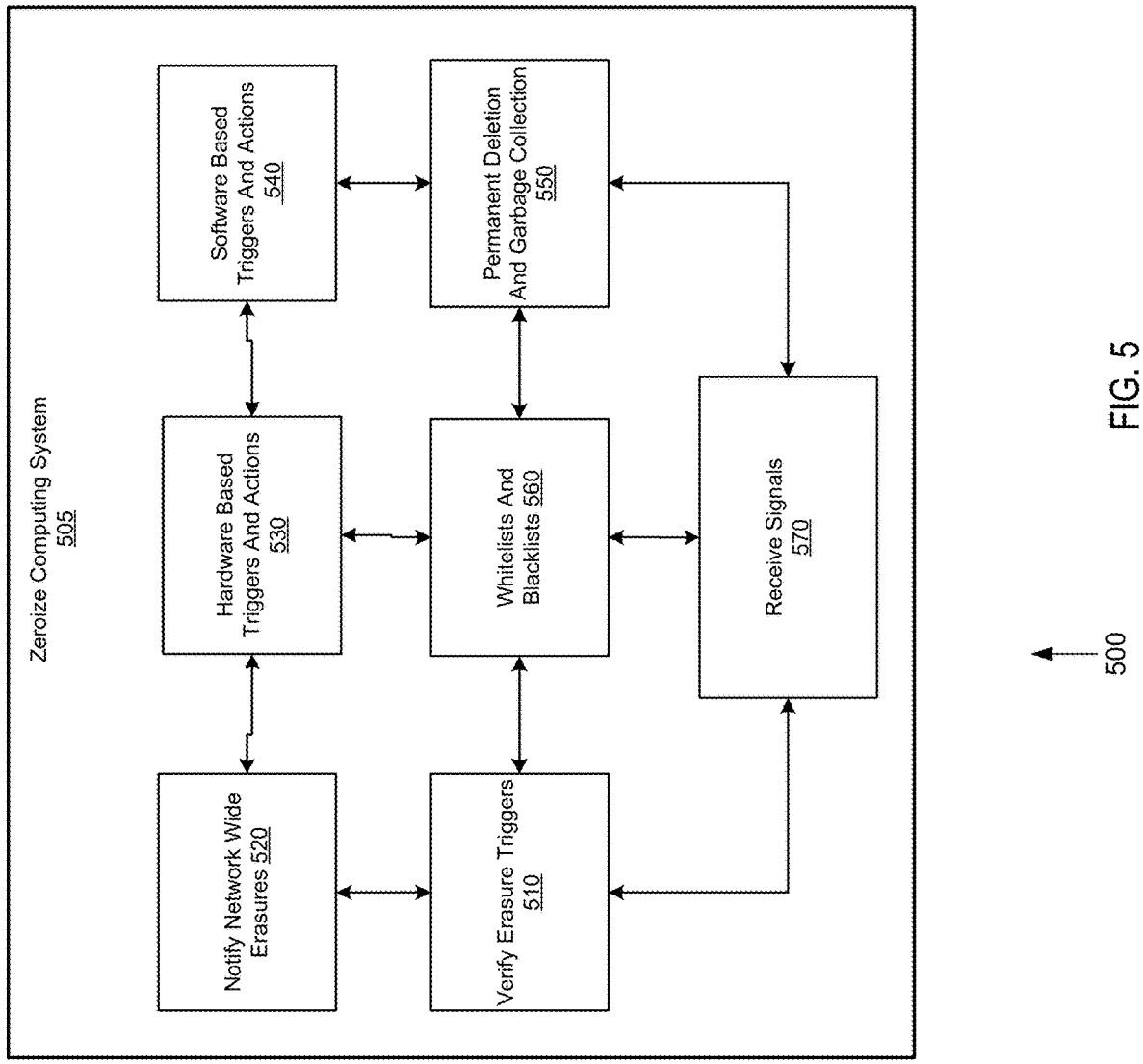
FIG. 5 is an exploded view of zeroization computing device, according to one embodiment.

FIG. 5 with 500 shows an exploded view of zeroize computing device 505 and the modules incorporated. At 570, the module receives signals that may or may not trigger zeroize operations on the computing device or network-wide. At 510, verification occurs to ensure that the signal is indeed one of the present erasure triggers. At 520, a decision is made as to whether the erasure trigger is local or network-wide. Signals are transmitted to connected devices on the network if network-wide erasure is required. At 530, hardware based triggers and actions are monitored. At 540, software based triggers and actions are monitored. At 550, permanent deletion of erased data occurs with garbage collection that resets system tables associated with the deleted tables. At 560, whitelist and blacklists are maintained. A computing device alias that is compromised is added to blacklist.

Figure 6:
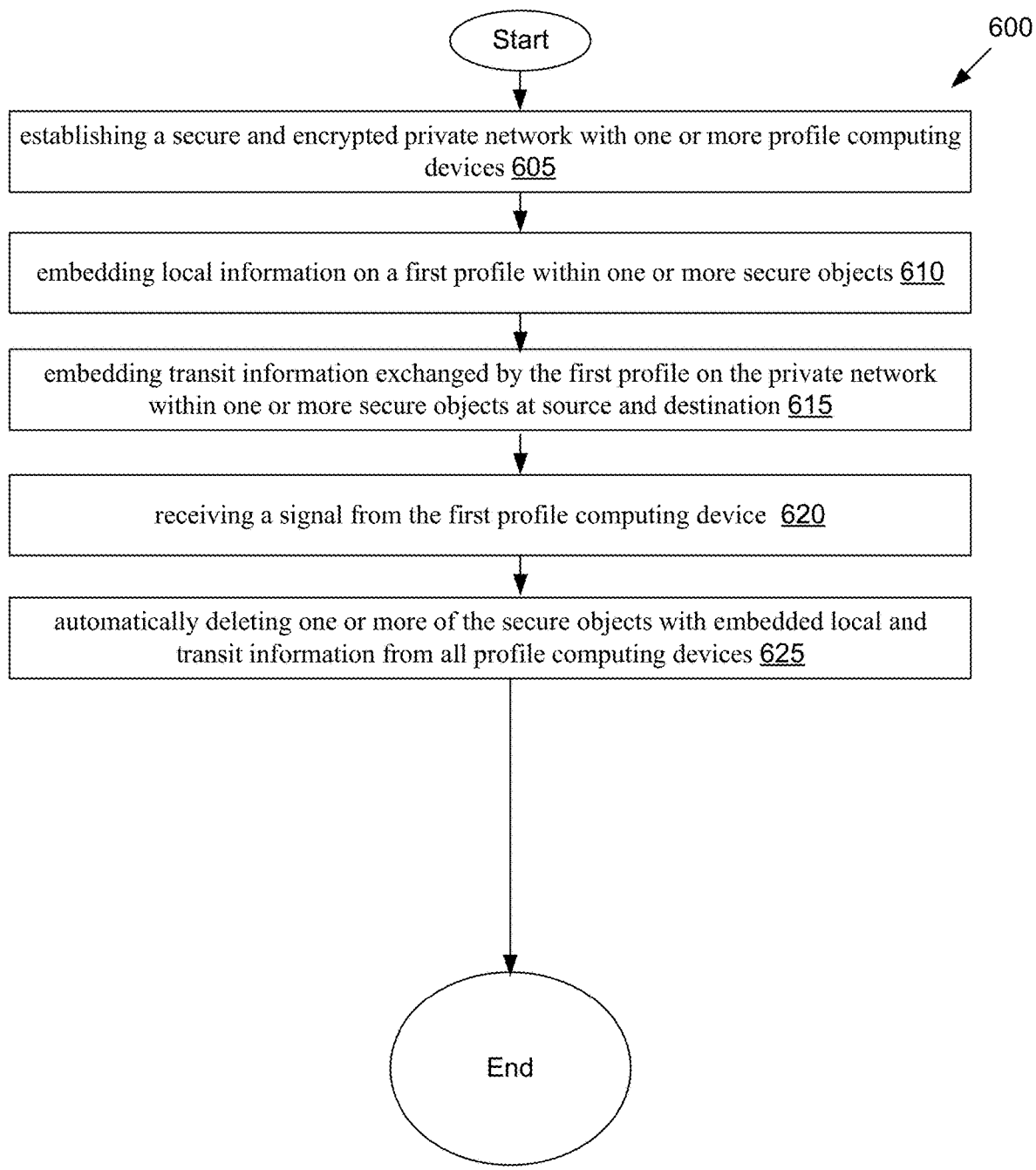
FIG. 6 shows a flowchart illustrating an example of a method of gesture triggered automatic erasure on a private network.

FIG. 6 depicts a flowchart 600 illustrating an example of a method gesture based automatic erasure on a private network. The flowchart 600 is discussed in conjunction with the environment shown in the diagram 100 in FIG. 1. At block 605, begins with establishing a secure and encrypted private network with one or more profile computing devices. At block 610, embedding local information on a first profile within one or more secure objects. At block 615, embedding transit information exchanged by the first profile on the private network within one or more secure objects at source and destination. At block 620, receiving a signal from the first profile computing device. At block 625, automatically deleting one or more of the secure objects with embedded local and transit information from all profile computing devices. A person of ordinary skill in the art would appreciate that by following the steps outlined above that is inbuilt into the computing device, the private network enforces automatic erasure with customized control at the data level that is implemented network-wide.

In a broad embodiment, the invention is systems and methods of automatic erasure that is gesture triggered on a private network allows a higher level of security of data distribution on the private network because when at risk, the data can be erased network-wide.

Figure 7:
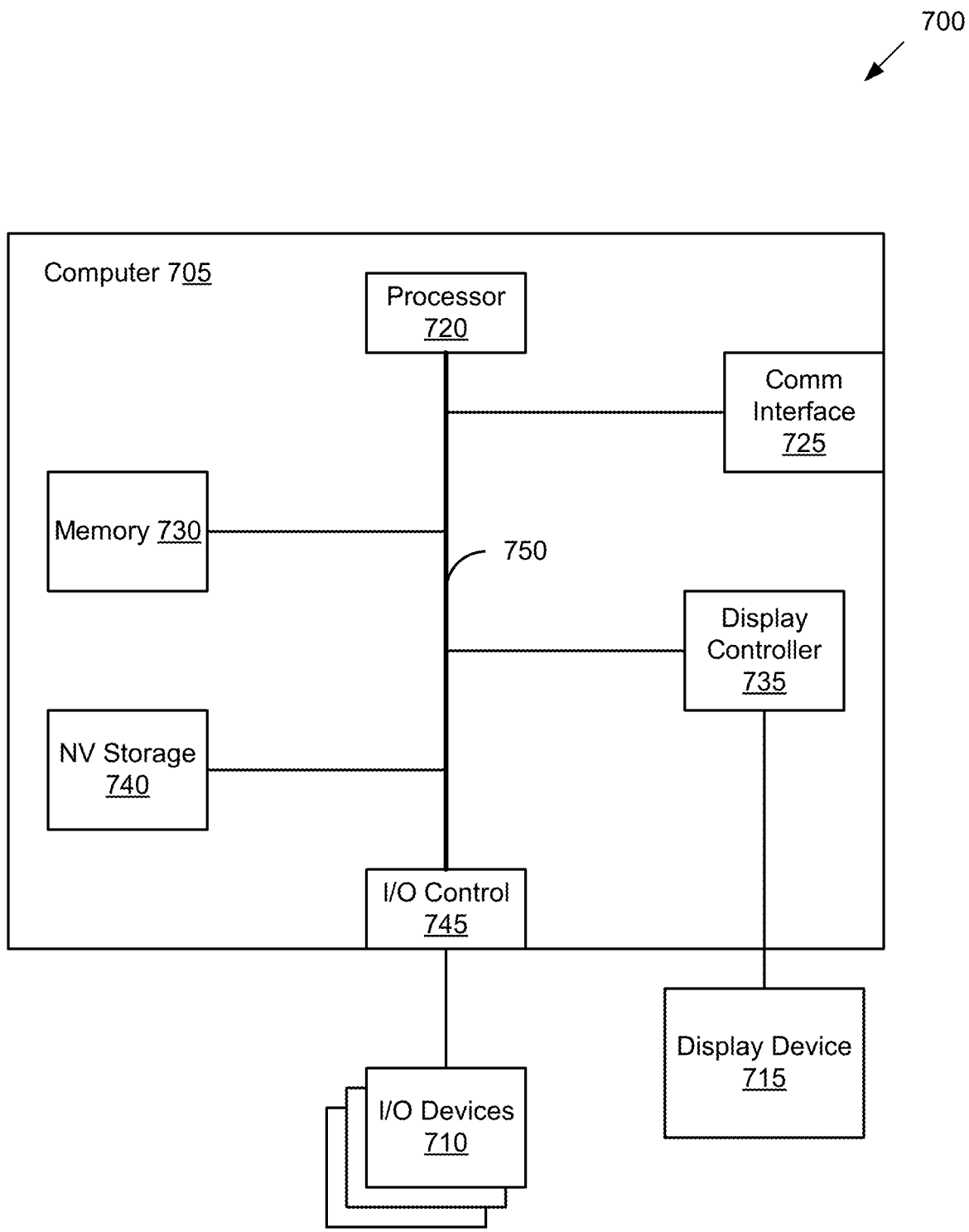
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
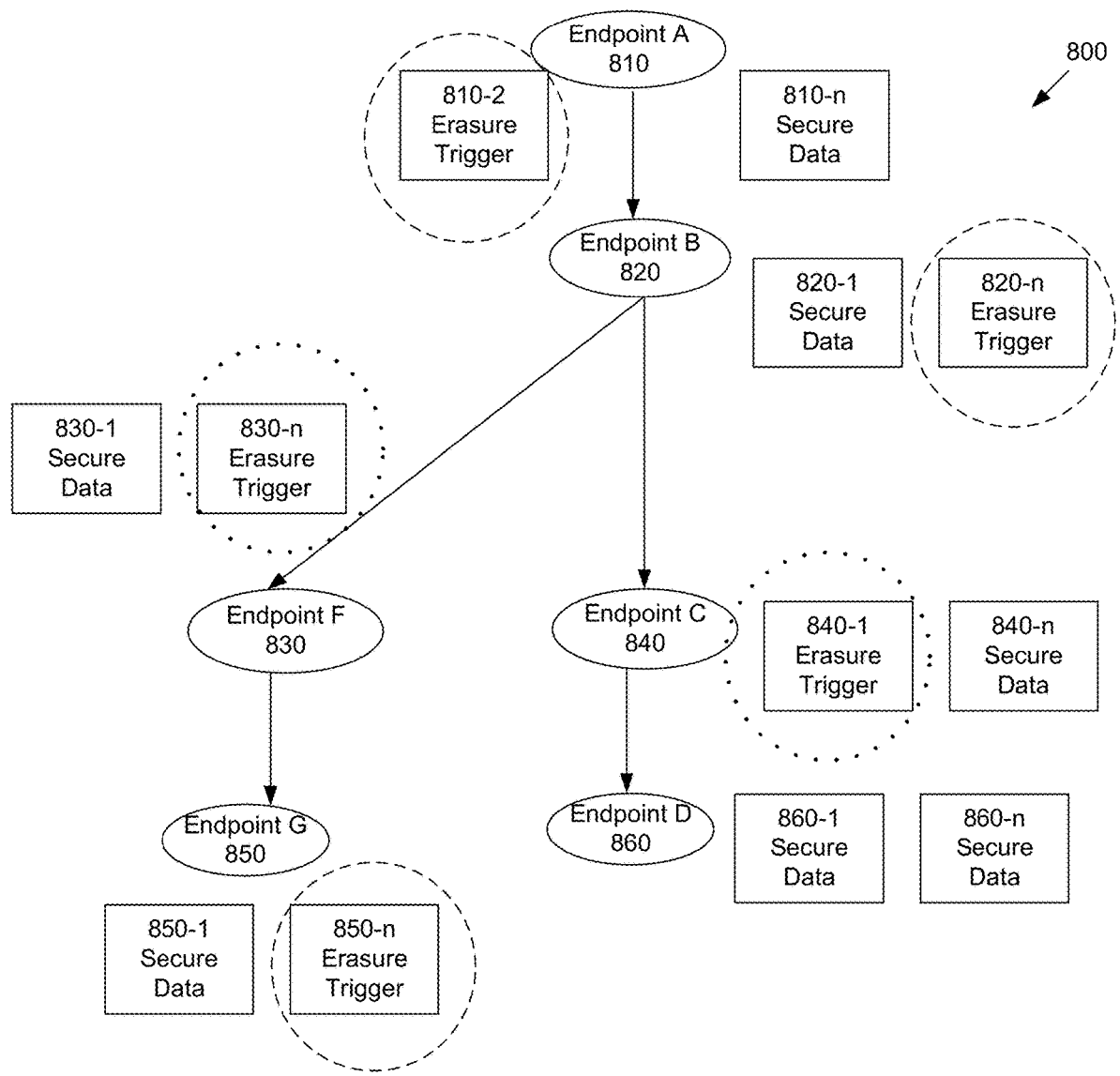
FIG. 8 is a staged level diagram illustrating data and trigger flow between different devices on the private network.

FIG. 8 shows different stages 800 with regards to different computing devices depicted as endpoints having different types of secure data and subsequent erasure triggers that are received throughout the private network. For example, in one embodiment, erasure trigger at 810-2 is related to conversation 1. Copies of the same conversation object are also with 820-*n* and 850-*n* as marked with the dashed circle. An action triggered for automatic erasure of conversation object 1 will be synchronized through the network with an update for all the copies of that particular conversation object 1. For example, if 820-n sends a message object to 810-2, that message object will also be added to the conversation object with alias 850-n. When the source or originator of message object from 820-n receives a trigger of automatic erasure, all the corresponding copies of the data objects are deleted network wide. If the originator of the conversation object, alias 810-2 triggers automatic erasure for the conversation, all the of the related conversation objects including all of the encompassed message objects will be deleted network wide.

In another example, alias 830-n and alias 840-1 have the same conversation object with erasure triggers. Endpoints 810 to 860 are different aliases operating on different computing devices on the private network. The secure data that are stored locally on an end point are shown in square boxes with the same alias number near the endpoints. Alias 830-n can make a copy of the conversation object and then request deletion of the original conversation object. Since the original conversation object originated from 830-n, the alias has full control on making copies including retaining a duplicate copy and then requesting a deletion of all of the copies network wide. Similarly, while alias 840-1 cannot make a duplicate copy of the entire conversation object for itself, the alias can make a duplicate copy of all of the messages that originated from it. Alias 840-1 may have a default rule to make a copy of all of the secure data that were sourced by it before deleting conversation objects triggered by others. A person of ordinary skill in the art would appreciate that the enforcing automatic erasure allows each user to individually customize its behavior and triggers. Similar to a real world situation, the originator of the information always has control in the digital world of the private network.

A person of ordinary skill in the art would appreciate that automatic erasure on the private network allows for network wide control and flexibility by providing a higher level of security that allows for erasing of data when the computing device or the private network holding the data is at risk. for the encapsulated data in the secure objects. Either an end-user or a computing device with artificial intelligence modules can control through the use of aliases equivalent functions to control the life cycle and distribution of data that originates from that alias.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method comprising:
   securely connecting, by a first computing device, with at least a second computing device via a secure and encrypted private network;
   embedding, by the first computing device, information within one or more secure objects on the first computing device;
   sending, by the first computing device, the one or more secure objects to the second computing device via the private network;
   detecting, by the first computing device, a signal as a zeroization trigger responsive to a user gesture; and
   sending, by the first computing device via the private network, a message informing the second computing device of the zeroization trigger, the message causing the second computing device to execute automatic erasure of the one or more secure objects stored on the second computing device;
   wherein: the second computing device belongs to a zeroization group; the message causing each member computing device belonging to the zeroization group to execute the automatic erasure of the one or more secure objects.

2. The method of claim 1, wherein the detecting includes determining the signal is a user-defined gesture to initiate the automatic erasure.

3. The method of claim 1, further comprising:
   storing, by the first computing device, a copy of the one or more secure objects based on a user of the first computing device having originated the information;
   the message causes the automatic erasure among all computing devices in the private network except the first computing device.

4. The method of claim 1, wherein:
   the message causes the second computing device to execute automatic erasure of all secure objects originated by a user of the first computing device; or
   the message indicates the zeroization trigger is related to the information, causing the second computing device to execute the automatic erasure of the one or more secure objects but not all the secure objects.

5. The method of claim 1, wherein:
   the second computing device is one of a plurality of counter parties in a distribution set;
   the message sent, via the private network, to respective computing devices of the counter parties to cause automatic erasure of the one or more secure objects by the respective computing devices.

6. One or more non-transitory tangible media encoded with logic for execution by a machine and when executed by the machine operable for:
   secure connecting, by the machine implemented as a first computing device, with at least a second computing device via a secure and encrypted private network;
   embedding, by the first computing device, information within one or more secure objects on the first computing device;
   sending, by the first computing device, the one or more secure objects to the second computing device via the private network;
   detecting, by the first computing device, a signal as a zeroization trigger responsive to a user gesture; and
   sending, by the first computing device via the private network, a message informing the second computing device of the zeroization trigger, the message causing the second computing device to execute automatic erasure of the one or more secure objects stored on the second computing device;

wherein: the second computing device belongs to a zeroization group; the message causing each member computing device belonging to the zeroization group to execute the automatic erasure of the one or more secure objects.

7. The one or more non-transitory tangible media of claim 6, wherein the detecting includes determining the signal is a user-defined gesture to initiate the automatic erasure.

8. The one or more non-transitory tangible media of claim 6, further operable for:

storing, by the first computing device, a copy of the one or more secure objects based on a user of the first computing device having originated the information;

the message causes the automatic erasure among all computing devices in the private network except the first computing device.

9. The one or more non-transitory tangible media of claim 6, wherein:

the message causes the second computing device to execute automatic erasure of all secure objects originated by a user of the first computing device; or the message indicates the zeroization trigger is related to the information, causing the second computing device to execute the automatic erasure of the one or more secure objects but not all the secure objects.

10. The one or more non-transitory tangible media of claim 6, wherein:

the second computing device is one of a plurality of counter parties in a distribution set;

the message sent, via the private network, to respective computing devices of the counter parties to cause automatic erasure of the one or more secure objects by the respective computing devices.

11. An apparatus implemented as a physical machine, the apparatus comprising:

non-transitory machine readable media configured for storing executable machine readable code;

a device interface circuit; and a processor circuit configured for executing the machine readable code as a secure executable container, and when executing the machine readable code operable for:

securely connecting with at least a second computing device via a secure and encrypted private network, embedding information within one or more secure objects stored in the apparatus;

sending the one or more secure objects to the second computing device via the private network;

detecting a signal as a zeroization trigger responsive to a user gesture, and sending, via the device interface circuit and the private network, a message informing the second computing device of the zeroization trigger, the message causing the second computing device to execute automatic erasure of the one or more secure objects stored on the second computing device wherein: the message causes the second computing device to execute automatic erasure of all secure objects originated by a user of the apparatus; or the message indicates the zeroization trigger is related to the information, causing the second computing device to execute the automatic erasure of the one or more secure objects but not all the secure objects.

* * * * *